(12) United States Patent
Takahashi et al.

(10) Patent No.: US 8,602,786 B2
(45) Date of Patent: Dec. 10, 2013

(54) ELECTRONIC APPARATUS INCLUDING PROTRUDING MEMBERS

(75) Inventors: Isao Takahashi, Miyagi-ken (JP); Nobuaki Haga, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 13/607,487

(22) Filed: Sep. 7, 2012

(65) Prior Publication Data
US 2013/0004921 A1   Jan. 3, 2013

Related U.S. Application Data

(63) Continuation of application No. PCT/JP2010/054422, filed on Mar. 16, 2010.

(51) Int. Cl.
*G09B 21/00* (2006.01)
(52) U.S. Cl.
USPC .......................................... 434/113; 434/112
(58) Field of Classification Search
USPC ....................... 434/113; 400/109.1
See application file for complete search history.

(56) References Cited

U.S. PATENT DOCUMENTS

| 5,449,292 | A | * | 9/1995 | Tani et al. | 434/114 |
| 5,718,588 | A | * | 2/1998 | Tretiakoff et al. | 434/114 |
| 6,819,228 | B2 | * | 11/2004 | Gipson et al. | 340/407.1 |
| 6,827,512 | B1 | * | 12/2004 | Souluer | 400/483 |
| 6,893,263 | B2 | * | 5/2005 | Tretiakoff et al. | 434/113 |
| 8,237,324 | B2 | * | 8/2012 | Pei et al. | 310/306 |
| 2004/0197745 | A1 | * | 10/2004 | Hong et al. | 434/113 |
| 2010/0159423 | A1 | * | 6/2010 | Hashizume et al. | 434/114 |
| 2013/0004922 | A1 | * | 1/2013 | Takahashi et al. | 434/113 |

FOREIGN PATENT DOCUMENTS

| JP | 2006-242986 | | 9/2006 |
| JP | 2007-121700 | | 5/2007 |
| JP | 2012068367 | A * | 4/2012 |

OTHER PUBLICATIONS

International Search Report dated Jun. 8, 2010 from International Application No. PCT/JP2010/054422.

* cited by examiner

*Primary Examiner* — Kathleen Mosser
*Assistant Examiner* — Peter J Alley
(74) *Attorney, Agent, or Firm* — Beyer Law Group LLP (57) ABSTRACT

A dot unit includes an opening formed in a housing and a protruding member disposed in the opening. The protruding member is rotatably supported by a support shaft. The protruding member is rotated by a polymer actuator in a direction that follows a reading direction in which a unit of information is read, and the protruding member is stabilized in a protruding position by contacting a restricting portion. When a finger is moved in the reading direction and contacts the protruding member, the protruding member is likely to be stabilized in the protruding position.

13 Claims, 10 Drawing Sheets

ELECTRONIC APPARATUS INCLUDING PROTRUDING MEMBERS

CLAIM OF PRIORITY

This application is a Continuation of International Application No. PCT/JP2010/054422 filed on Mar. 16, 2010. The entire contents of the application noted above are hereby incorporated by reference.

BACKGROUND OF THE INVENTION

1. Field of the Invention

The present invention relates to an electronic apparatus that includes protruding members rotated by actuators so as to protrude from a surface of a housing and that is used as a dot display device, a protruding-type operation device, or the like.

2. Description of the Related Art

Electronic apparatuses that include protruding members that are rotated by actuators so as to protrude from a surface of a housing are used, for example, as a dot display device such as a Braille cell, which is a device for conveying information to a visually handicapped person, and as an operation device including operation buttons and keytops that protrude from an operation panel as necessary.

Japanese Unexamined Patent Application Publication No. 6-301335 describes a Braille cell module, which is a dot display apparatus. In the Braille cell module, a plurality of holes are formed in a tactile panel, and a tactile pin is inserted into each of the holes so as to be protrudable and retractable. A rotary lifting cam is disposed below each of the tactile pins, and the lifting cam is rotated by a bimorph piezoelectric actuator. When one of the lifting cams is rotated by the piezoelectric actuator, a corresponding one of the tactile pins is made to protrude by the rotational force of the lifting cam.

Japanese Unexamined Patent Application Publication No. 2007-121700 describes an information conveying apparatus in which two pins are rotatably disposed in an elongated hole formed in a tactile surface of a housing. Depending on whether one pin is protruding or two pins are protruding from the elongated hole, different pieces of information are conveyed to a finger that is in contact with the pin/pins.

The Braille cell module described in Japanese Unexamined Patent Application Publication No. 6-301335 has a structure such that a lifting cam is rotated by a piezoelectric actuator and a tactile pin is made to protrude by the rotational force of the lifting cam. Because friction is generated between the lifting cam and the tactile pin, the driving load is high and thereby malfunction is likely to occur.

The information conveying apparatus described in Japanese Unexamined Patent Application Publication No. 2007-121700 has a structure such that two pins rotate in opposite directions in an elongated hole and protrude from the elongated hole. Therefore, the structure is complicated and the driving load is high. Moreover, since the two pins rotate in opposite directions, it is difficult to stabilize the pins in their protruding positions.

SUMMARY OF THE INVENTION

The present invention addresses the problems of the related art describe above and provides an electronic apparatus including protruding members each of which can be made to protrude with a comparatively light driving force by efficiently using a driving force of an actuator and that is likely to be stabilized in a protruding position and in a retracted position.

According to an aspect of the present invention, an electronic apparatus includes a plurality of protruding members protrudable from a surface of a housing, the protruding members being arranged in an operation direction and each being supported so as to be rotatable around a rotation axis in the housing; a plurality of actuators each making one of the protruding members to protrude from the surface of the housing by rotating the protruding member in a rotation direction at least including a rotation component directed toward the operation direction; and a plurality of restricting portions each restricting a tilt of one of the protruding members in the operation direction when the protruding member is protruding.

With the electronic apparatus, each of the protruding members is made to protrude from the surface of the housing by being directly rotated by a driving force of the actuator. Therefore, the driving force of the actuator can be efficiently transmitted to the protruding member, whereby the reliability of an operation of the electronic apparatus can be improved. Since the protruding member is made to protrude in the operation direction, further rotation of the protruding member in the operation direction is restricted when the protruding member is in the protruding position, whereby the protruding member is stabilized in the protruding position when a finger contacts the protruding member in the protruding position.

In the electronic apparatus, a plurality of dot display portions may be arranged in the operation with distances therebetween, each of the dot display portions including a plurality of dot units each including one of the protrusions; one unit of information may be displayed by selectively making the protrusions of the dot units of one of the dot display portion to protrude; the operation direction may correspond to a reading direction in which the unit of information is read; and the electronic apparatus may be used as a dot information display apparatus.

In the dot information display apparatus, a plurality of protruding members constitute a dot display portion and a unit of information such as a Braille character is displayed. In this case, when the plurality of protruding members are read by moving a finger in the operation direction, the protruding positions of all of the protruding members are stabilized.

In the electronic apparatus, the rotation axis of each of the protruding members may be diagonally disposed at an angle smaller than 90 degrees with respect to the operation direction.

In this case, the rotation direction of each of the protruding members that constitutes a dot display portion is diagonal with respect to the operation direction, such as the reading direction. As a result, the protruding members can be disposed close to each other. When the housing has an elongated hole for allowing each of the protruding members to rotate, by diagonally forming the opening of the elongated hole, the areas in which the protruding members rotate can be efficiently arranged so as to be close to each other.

In the electronic apparatus, each of the protruding members may include a pressed portion for protruding movement and a pressed portion for retracting movement, the protruding member may protrude when the actuator presses the pressed portion for protruding movement, and the protruding member may retract when the actuator presses the pressed portion for retracting movement.

In this case, a rotational driving force in the protruding direction and a rotational driving force in the retracting direction can be applied to the protruding member by a driving force of a single actuator.

In the electronic apparatus, the center of gravity of each of the protruding members may be located forward of the rotation axis in the operation direction when the protruding member is protruding. In this case, the protruding member is more likely to be stabilized in the protruding position.

The electronic apparatus may further include a plurality of retraction restricting portions each restricting further rotation of one of the protruding members when the protruding member is retracted.

The electronic apparatus may further include a plurality of rotation restricting members each rotated by one of the actuators, and when one of the protruding members is protruding, a corresponding one of the rotation restricting member may be set in a restricting position in which the rotation restricting member restricts rotation of the protruding member in a retracting direction, and when the actuator moves the protruding member in the retracting direction, the rotation restricting member may be set in a retracted position in which the rotation restricting member does not contact the protruding member by a movement force of the actuator.

In this case, the protruding member can be rotated between the protruding position and the retracted position by a single actuator. Moreover, rotation of the protruding member in either direction can be restricted when the protruding member is in the protruding position. Thus, malfunction in that the protruding member is unintentionally rotated when a finger contacts the protruding member can be more likely to be prevented.

According to a second aspect of the present invention, an electronic apparatus includes a protruding member protrudable from a surface of a housing, the protruding member being supported so as to be rotatable in the housing; and an actuator making the protruding member to protrude from the surface of the housing by rotating the protruding member. The protruding member includes a pressed portion for protruding movement and a pressed portion for retracting movement. The protruding member protrudes when the actuator presses the pressed portion for protruding movement and the protruding member retracts when the actuator presses the pressed portion for retracting movement.

The electronic apparatus according to the second aspect may further include a rotation restricting member rotated by the actuator, and when the protruding member is protruding, the rotation restricting member may be set in a restricting position in which the rotation restricting member restricts rotation of the protruding member in a retracting direction, and when the actuator moves the protruding member in the retracting direction, the rotation restricting member may be set in a retracted position in which the rotation restricting member does not contact the protruding member by a movement force of the actuator.

It is preferable that the actuator flexurally deform in a direction following the surface of the housing. In this case, the thickness of the housing can be reduced easily.

A polymer actuator may be used as the actuator. Alternatively, an element having a comparatively large displacement amount, such as a shape memory alloy (SMA), a shape memory polymer (SMP), a piezoelectric polymer such as polyvinylidene fluoride (PVDF) may be used as the actuator.

With the electronic apparatus including protruding members, each of the protruding members can be rotated to the protruding position with a comparatively light load. Moreover, when the protruding member is in the protruding position, rotation of the protruding member is restricted in the operation direction, such as a reading direction, whereby the protruding member is likely to be stabilized in the protruding position when a finger contacts the protruding member.

DESCRIPTION OF THE PREFERRED EMBODIMENTS

Figure 1:
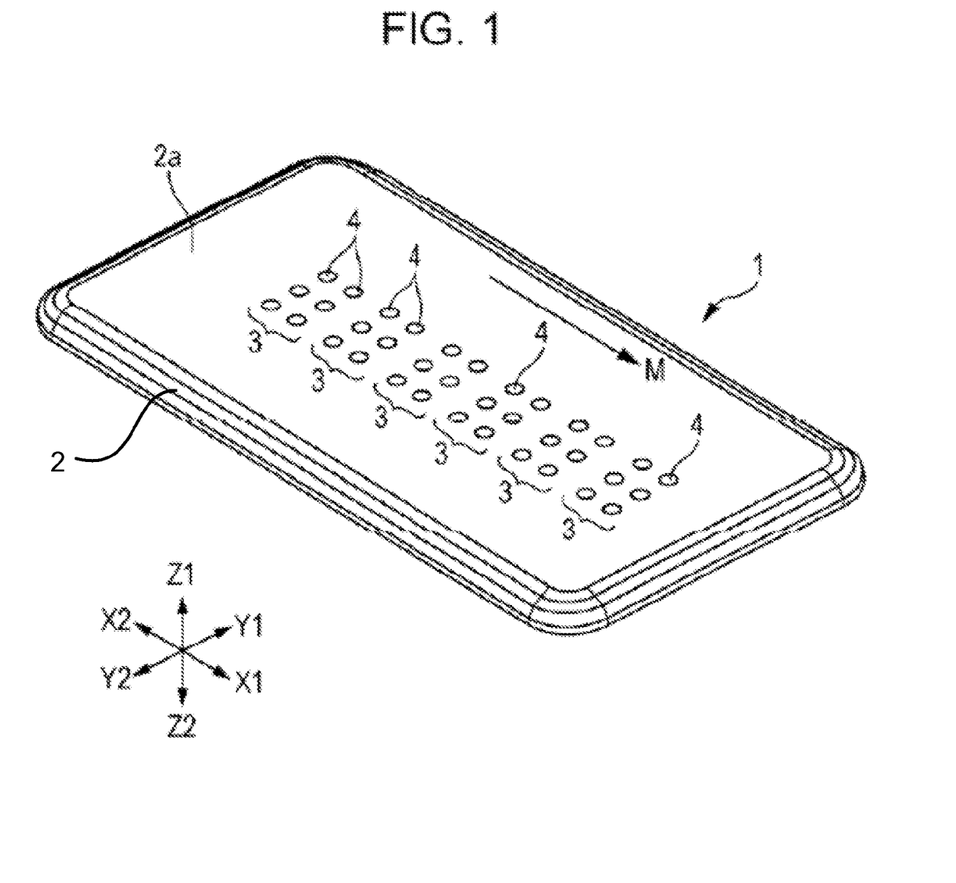
FIG. 1 is a perspective view illustrating the overall structure of a dot information display apparatus, which is an electronic apparatus including protruding members according to an embodiment of the present invention.

FIG. 1 is a perspective view illustrating the overall structure of a dot information display apparatus 1, which is an electronic apparatus including protruding members according to an embodiment of the present invention. The dot information display apparatus 1 is used as a Braille cell that conveys information to a visually handicapped person.

The dot information display apparatus 1 includes a thin housing 2. A surface 2a of the housing 2 is a tactile display surface. A plurality of dot display portions 3 are arranged on the surface 2a of the housing 2. Each dot display portion 3 includes a plurality of dot units 4. In the example illustrated in FIG. 1, each dot display portion 3 includes six dot units 4. The six dot units 4 of each dot display portion 3 are arranged at a regular pitch in the X1-X2 direction, which is the longitudinal direction of the housing 2, and at a regular pitch in the Y1-Y2 direction, which is the width direction of the housing 2. As a result, a dot matrix is formed.

Figure 2:
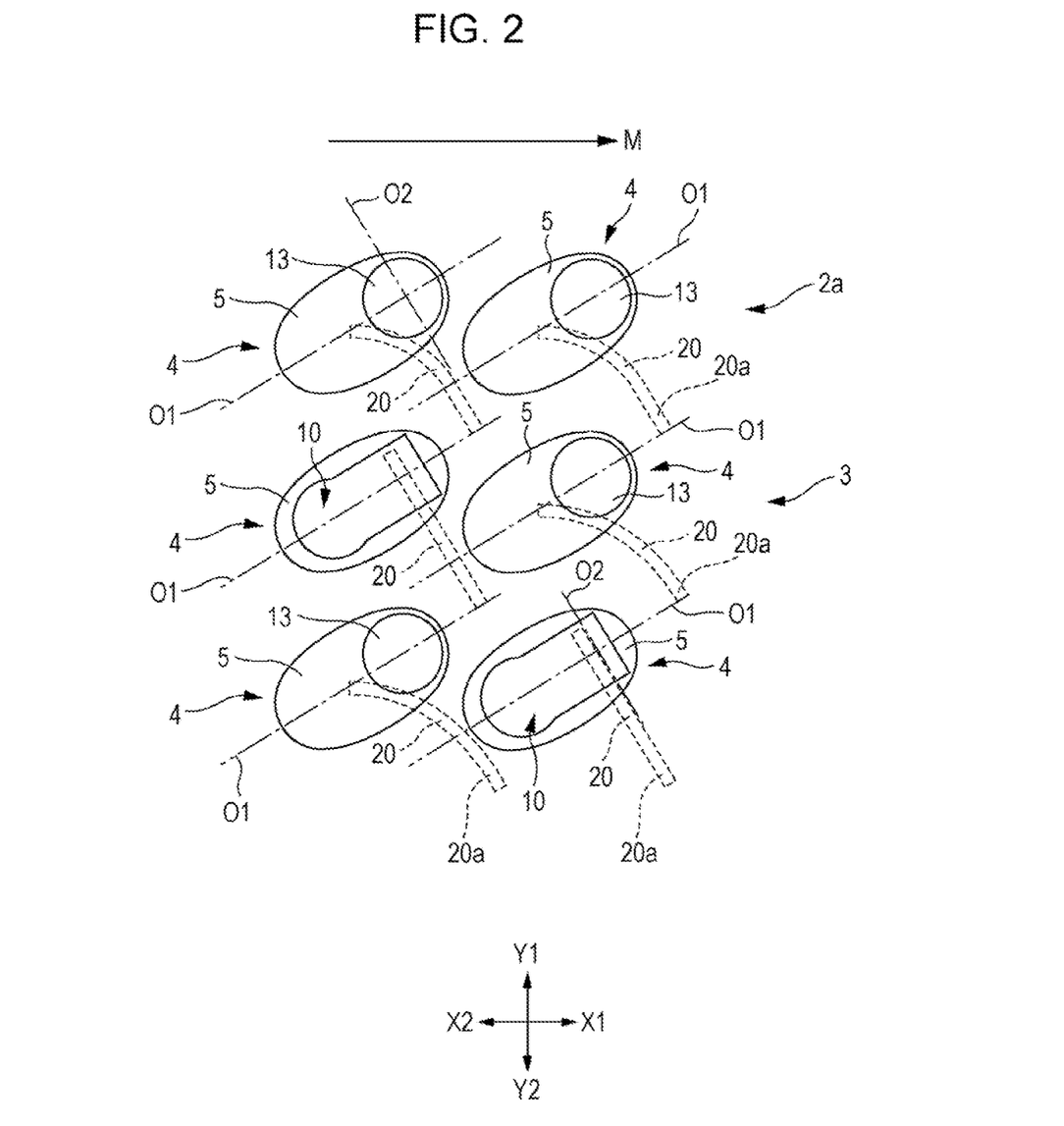
FIG. 2 is a plan view illustrating a set of dot display portions on a surface of a housing.

As illustrated in FIG. 2, each dot unit 4 includes a protruding member 10. Each dot unit 4 is capable of conveying two pieces of information in accordance with whether the protruding member 10 is protruding from or retracted into the surface 2a of the housing 2. Each dot display portion 3 is capable of conveying one unit of information (one Braille character) by selectively making the protruding members 10 of the six dot units 4 to protrude.

As illustrated in FIG. 1, the dot display portions 3 are arranged at a regular pitch in the X1-X2 direction. The X1 direction is a reading direction M of the dot information display apparatus 1. A user who receives information, such as a visually handicapped person, touches an end portion of the surface 2a of the housing 2 on the X2 side with a finger and slides the finger in the reading direction M. At this time, units of information are successively conveyed to the finger from respective dot display portions 3.

The units of information displayed by respective dot display portions 3 change at regular time intervals. After obtaining information from all of the dot display portions 3 by sliding the finger in the reading direction M, a user can obtain the next information from the dot display portions 3 by moving the finger back to the end portion on the X2 side and sliding the finger in the reading direction M again.

In the dot information display apparatus 1 illustrated in FIG. 1, six dot display portions 3 are arranged in a row in the reading direction M. However, the number of the dot display portions 3 in a row may be larger than six. The dot display portions 3 may be arranged in two or more rows that extend in the X1-X1 direction and that are arranged with a distance therebetween in the Y1-Y2 direction. In this case, after sliding a finger in the reading direction M along the first row, a user can obtain units of information from a large number of the dot display portions 3 by moving the finger back to the X2 side and moving the finger in the reading direction M along the next row.

FIG. 2 illustrates the six dot units 4 that are arranged in one of the dot display portions 3. Each dot unit 4 has an opening 5 that extends through the surface 2a of the housing 2. Each opening 5 is an elongated hole having an elongated circular shape or an elliptical shape. The openings 5 have opening center lines O1 that extend parallel to each other in the longitudinal direction of the openings 5. The opening center lines O1 extend diagonally at an angle smaller than 90 degrees with respect to the X1-X2 direction and the Y1-Y2 direction.

Figure 3:
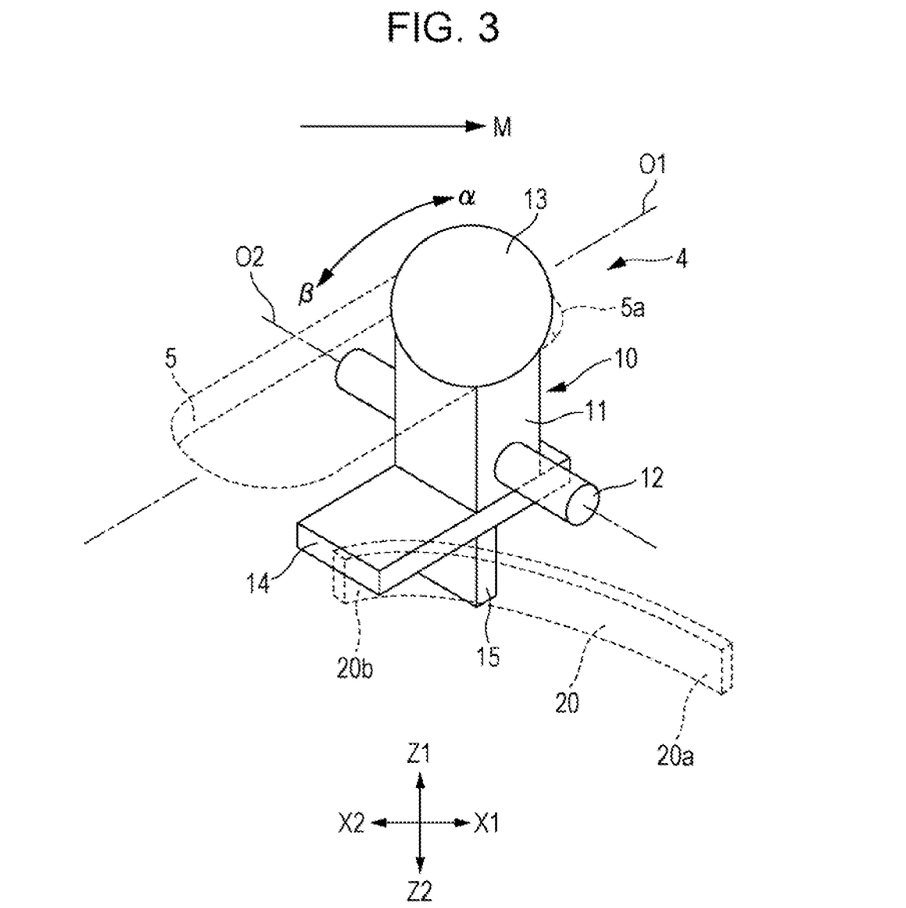
FIG. 3 is a partial perspective view illustrating the structures of a protruding member and an actuator in a dot unit.

As illustrated in FIG. 3, each dot unit 4 includes one protruding member 10. The protruding member 10 is made of a synthetic resin material. The protruding member 10 includes a support portion 11 and a support shaft 12 that protrudes on the right and left sides of the support portion 11. The support shaft 12 is integrally formed with the support portion 11. The support shaft 12 is rotatably supported by bearings disposed in the housing 2. Alternatively, the support shaft 12 may be fixed to an inner part of the housing 2 and the support portion 11 may be rotatably supported by the support shaft 12.

Figure 5A:
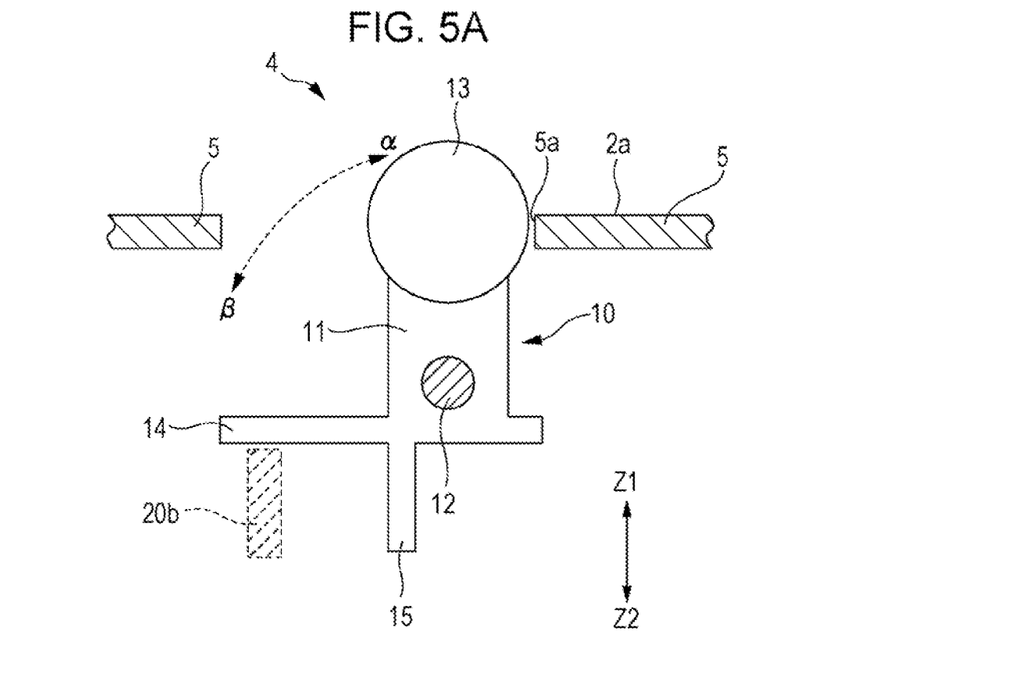
FIGS. 5A and 5B are sectional views illustrating the rotational operation of the protruding member illustrated in FIG. 3.
Figure 5B:
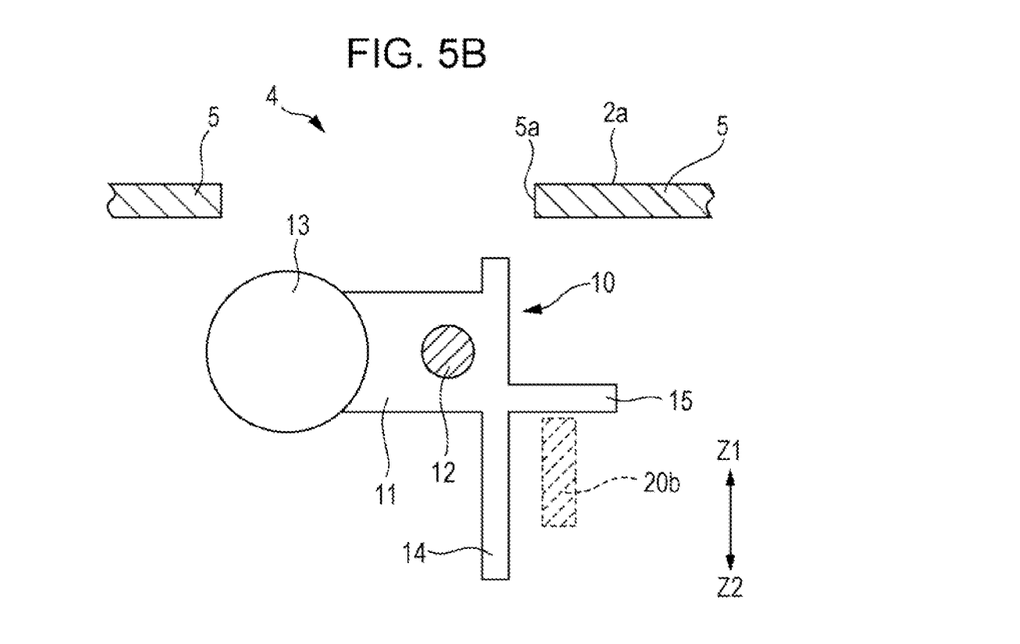

The protruding member 10 is rotatable in a direction α and in a direction β around a rotation axis O2, which is the axis of the support shaft 12. The direction α is a protruding direction and the direction β is a retracting direction. As illustrated in FIGS. 3 and 5A, when the protruding member 10 rotates in the protruding direction α, a spherical contact portion 13, which is integrally formed with an end portion of the support portion 11, protrudes above the surface 2a of the housing 2. As illustrated in FIG. 5B, when the protruding member 10 rotates in the retracting direction β, the protruding member 10 takes a retracted position in which the contact portion 13 does not protrude from the surface 2a of the housing 2.

The rotation axis O2 is located inside of the housing 2 and extends substantially parallel to the surface 2a of the housing 2. As illustrated in FIGS. 2 and 3, the rotation axis O2 is perpendicular to the opening center line O1, and the rotation axis O2 extends diagonally at an angle smaller than 90 degrees with respect to the reading direction M. As a result, the rotation direction of the protruding member 10 is diagonal with respect to the reading direction M, and the rotational motion of the protruding member 10 in the protruding direction α has a rotational component oriented in the reading direction M, i.e., a rotational component oriented in the X1 direction around the Y1-Y2 direction.

As illustrated in FIGS. 3, 5A, and 5B, an end portion of the inner peripheral surface of the opening 5 facing in a direction opposite to the reading direction M is a restricting portion (stopper portion) 5a. When the protruding member 10 rotates in the protruding direction α and the contact portion 13 protrudes from the surface 2a of the housing 2, a part of the protruding member 10 contacts the restricting portion 5a and thereby the protruding member 10 is prevented from rotating further in the direction α.

As illustrated in FIGS. 3, 5A, and 5B, a pressed portion 14 for protruding movement and a pressed portion 15 for retracting movement are integrally formed with the protruding member 10. The pressed portions 14 and 15 extend perpendicular to each other.

Figure 4:
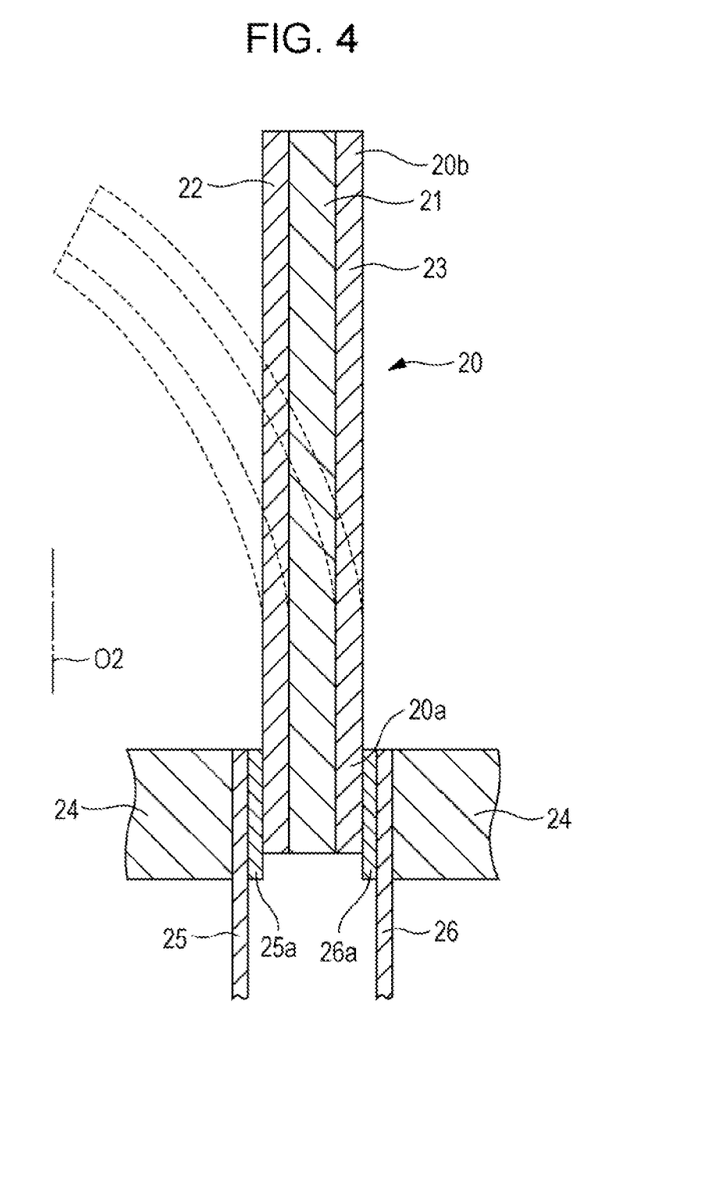
FIG. 4 illustrates the structure and the operation of a polymer actuator.

As illustrated in FIGS. 2 and 3, each dot unit 4 includes a polymer actuator 20. As illustrated in FIG. 4, the polymer actuator 20 includes an electrolyte layer 21 having a plate-like shape, a first electrode layer 22 formed on one side of the electrolyte layer 21, and a second electrode layer 23 formed on the other side of the electrolyte layer 21. The electrolyte layer 21 is made of a polymer, such as polyvinylidene fluoride (PVDF) or polymethyl methacrylate (PMMA), impregnated with an ionic liquid (electrolytic solution). The first electrode layer 22 and the second electrode layer 23 are made of the aforementioned polymer that is impregnated with an ionic liquid and that further includes electroconductive filler. The electroconductive filler is carbon nanotubes or the like.

As illustrated by a solid line in FIG. 4, when a voltage is not applied to the first electrode layer 22 and the second electrode layer 23, the polymer actuator 20 is not flexurally deformed and has a substantially linear shape. If the positive ions included in the electrolyte layer 21 are larger than the negative ions included in the electrolyte layer 21, when a potential difference is generated between the first electrode layer 22 and the second electrode layer 23 so that the first electrode layer 22 has a positive potential, the distribution of the positive ions becomes biased toward the second electrode layer 23, and thereby a part of the electrolyte layer 21 on the second electrode layer 23 side expands. At this time, as illustrated by a broken line in FIG. 4, the polymer actuator 20 becomes flexurally deformed such that the second electrode layer 23 is located on the convex side.

As illustrated in FIG. 4, a base end portion 20a of the polymer actuator 20 and wiring substrates 25 and 26 are sandwiched between and supported by support members 24. The wiring substrate 25 includes an electrode portion 25a and an electroconductive pattern that is electrically connected to the electrode portion 25a. The wiring substrate 26 includes an electrode portion 26a and an electroconductive pattern that is electrically connected to the electrode portion 26a. The electrode portion 25a is in close contact with the first electrode layer 22, and the electrode portion 26a is in close contact with the second electrode layer 23.

As illustrated in FIG. 3, the polymer actuator 20 is disposed such that the width direction thereof coincides with the Z1-Z2 direction and the plate surfaces thereof extend in the vertical direction. The base end portion 20a of the polymer actuator 20 is supported by the support members 24 so as to extend parallel to the rotation axis O2. As illustrated in FIGS. 3, 5A, and 5B, a tip end portion 20b of the polymer actuator 20 faces a lower part of the protruding member 10.

As illustrated in FIG. 2, for each dot unit 4 included in one dot display portion 3, the opening center line O1 extends diagonally at an angle smaller than 90 degrees with respect to the reading direction M, and the rotation axis O2 extends diagonally at an angle smaller than 90 degrees with respect to the reading direction M. The base end portion 20a of the polymer actuator 20 is fixed in place so as to be oriented in a direction parallel to the rotation axis O2. Thus, the protruding members 10 and the polymer actuators 20 of the dot units 4 are arranged with high space efficiency, and it is not necessary that the dot units 4 be spaced apart from each other by a large distance in each dot display portion 3.

In each dot unit 4, when the polymer actuator 20 becomes flexurally deformed as illustrated by a broken line in FIG. 4, the tip end portion 20b of the polymer actuator 20 presses the pressed portion 14 for protruding movement, and thereby the protruding member 10 rotates in the protruding direction α to a protruding position as illustrated in FIGS. 3 and 5A. When the polymer actuator 20 returns to the initial state as illustrated by straight lines in FIG. 4, the tip end portion 20b presses the pressed portion 15 for retracting movement, and thereby the protruding member 10 rotates in the retracting direction β to the retracted position as illustrated in FIG. 5B.

As illustrated in FIGS. 3 and 5A, the protruding direction α, in which the protruding member 10 is moved to the protruding position, is a direction that follows the reading direction M. When the protruding member 10 is in the protruding position, the protruding member 10 is in contact with the restricting portion 5a of the opening 5, and thereby the protruding member 10 is prevented from rotating further in the direction α. A user's finger moves in the reading direction M while being in contact with the surface 2a of the housing 2 illustrated in FIG. 1. Therefore, the finger moves in a direction such that the protruding member 10 in the protruding position is pressed against the restricting portion 5a. As a result, even if the polymer actuator 20, which makes the protruding member 10 protrude, is not rigid, the protruding member 10 is likely to be prevented from unintentionally moving in the direction β from the protruding position.

Figure 6:
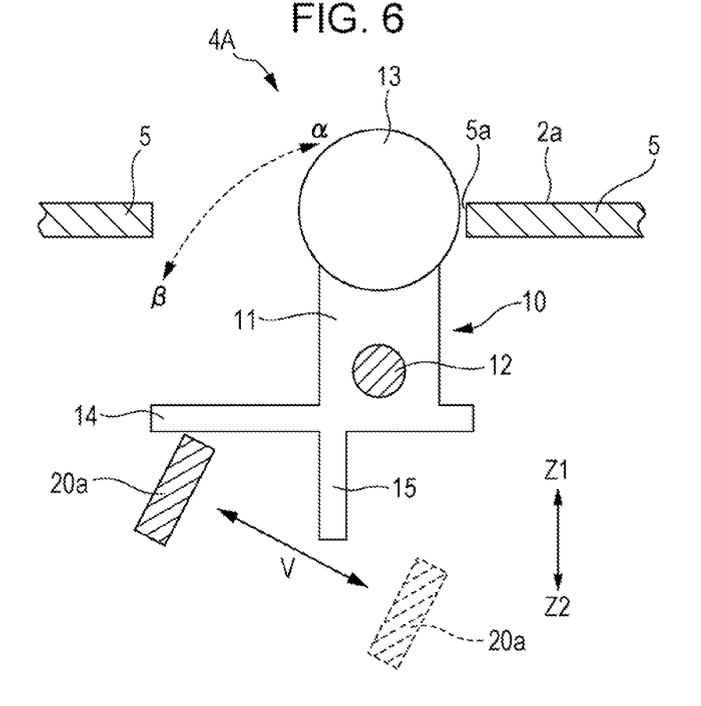
FIG. 6 is a sectional view illustrating the structure of a dot unit according to a second embodiment.

FIG. 6 illustrates a dot unit 4A according to a second embodiment of the present invention. The opening 5 and the protruding member 10 of the dot unit 4A, the manner in which the these members are attached, and the directions in which these members are attached are the same as those of the dot unit 4 illustrated in FIGS. 3, 5A, and 5B.

As illustrated in FIG. 6, when the protruding member 10 is in the protruding position, the pressed portion 14 for protruding movement extends in a horizontal direction parallel to the surface 2a of the housing 2 and the pressed portion 15 for retracting movement extends in a direction perpendicular to the surface 2a.

The width direction of the polymer actuator 20 extends diagonally with respect to the up-down direction (Z1-Z2 direction). The polymer actuator 20 generates a driving force in a direction V, i.e., flexurally deforms in the direction V, which extends diagonally at an angle smaller than 90 degrees with respect to each of the pressed portion 14 and the pressed portion 15. Therefore, when the polymer actuator 20 becomes flexurally deformed, a force generated by the deformation can be easily converted to a moment for rotating the protruding member 10.

As a result, when the protruding member 10 is rotated in the protruding direction α, the protruding member 10 can be pressed against the restricting portion 5a sufficiently strongly with the deformation force of the polymer actuator 20, and the thereby the protruding member 10 is likely to be stabilized in the protruding position.

Figure 7:
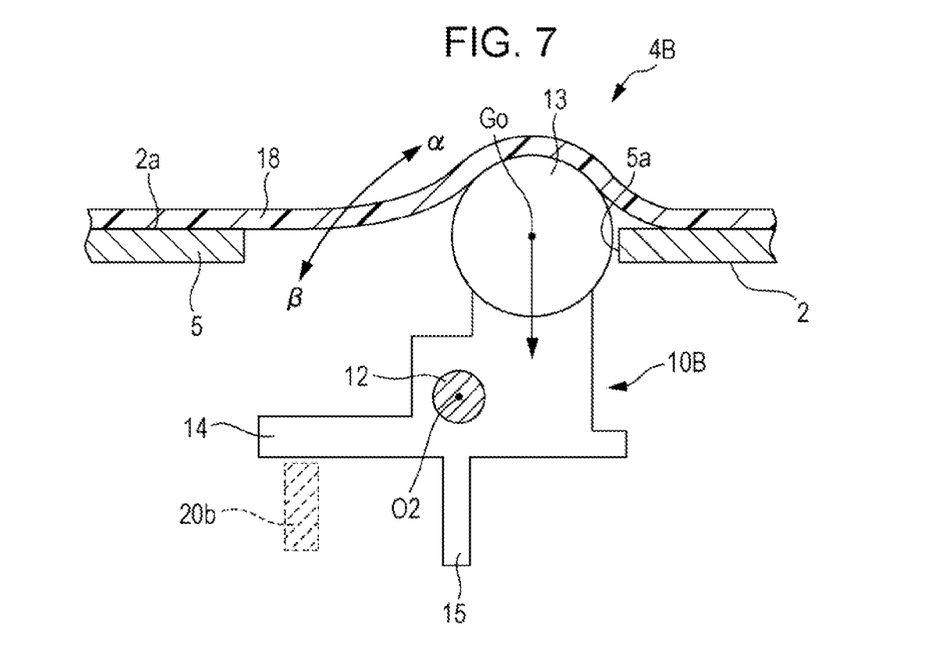
FIG. 7 is a sectional view illustrating the structure of a dot unit according to a third embodiment.

FIG. 7 illustrates a dot unit 4B according to a third embodiment of the present invention. In a protruding member 10B illustrated in FIG. 7, the position of the support shaft 12 (the position of the rotation axis O2) and the position of the center of gravity G0 of the protruding member 10B are displaced from each other. The center of gravity G0 is displaced forward of the support shaft 12 in the reading direction M.

As illustrated in FIG. 7, when the protruding member 10B is rotated by the polymer actuator 20 to the protruding position, a moment, which is generated around the rotation axis O2 in the protruding direction α due to the mass of the protruding member 10B, acts on the protruding member 10B. The protruding member 10B is constantly pressed against the restricting portion 5a by the moment, so that the protruding member 10B is likely to be stabilized in the protruding position.

In the embodiment illustrated in FIG. 7, the entire area of the surface 2a of the housing 2 is covered with a cover sheet 18 and all the openings 5 are closed. The cover sheet 18 is a very thin and soft synthetic rubber film that is made of a silicone or a polyurethane. The openings 5 are covered with the cover sheet 18. Moreover, when the protruding member 10B rotates to the protruding position, the cover sheet 18 protrudes upward and the protrusion can be detected by tactile sensation of a finger.

The cover sheet 18 may be included in the dot units 4 and 4A illustrated in FIGS. 3, 5A, 5B, and 6; and may be used in other embodiments described below.

Figure 8A:
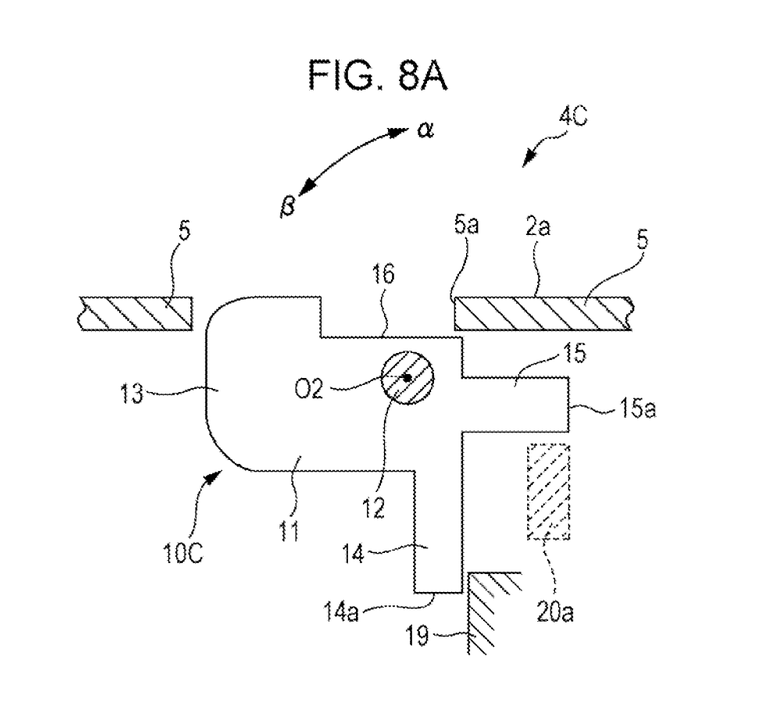
FIGS. 8A and 8B are sectional views illustrating the structure of a dot unit according to a fourth embodiment.
Figure 8B:
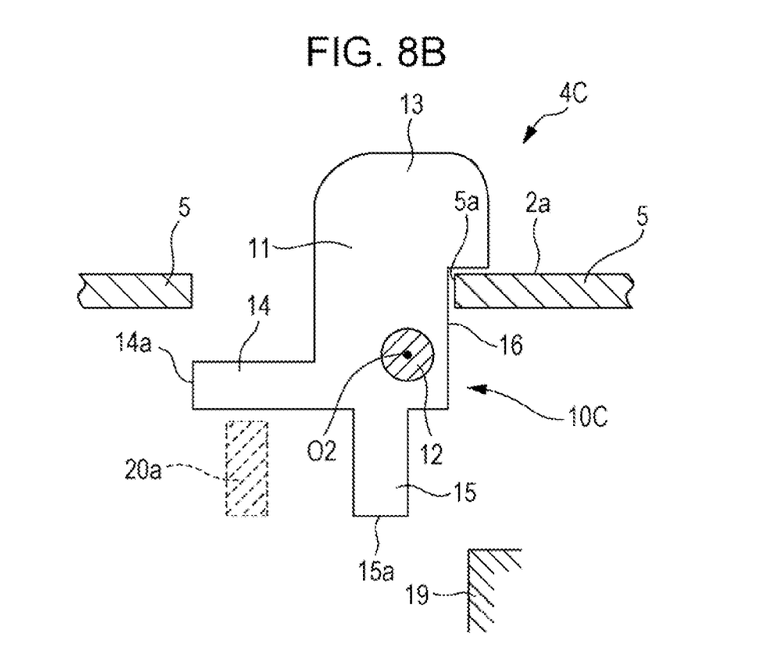

FIGS. 8A and 8B illustrate a dot unit 4C according to a fourth embodiment of the present invention. The dot unit 4C includes a protruding member 10C having a recess 16 formed in a side surface thereof facing in the protruding direction α. As illustrated in FIG. 8B, when the protruding member 10C is in the protruding position, the recess 16 engages with the restricting portion 5a at an end of the opening 5. When a finger moves in the reading direction M and presses the protruding member 10C, which is in the protruding position, in the direction α, the recess 16 is pressed against the restricting portion 5a, so that the protruding member 10C is likely to be stabilized in the protruding position.

The distance from the rotation axis O2, which is the axis of the support shaft 12, to a tip end 14a of the pressed portion 14 for protruding movement is larger than the distance from the rotation axis O2 to a tip end 15a of the pressed portion 15 for retracting movement. A retraction restricting portion 19 is disposed below the support shaft 12 in the housing 2.

As illustrated in FIG. 8A, when the protruding member 10C rotates to the retracted position, the pressed portion 14 for protruding movement contacts the retraction restricting portion 19, so that the retracted position of the protruding member 10C is stabilized. When the protruding member 10C rotates from the retracted position in the direction α, the pressed portion 15 for retracting movement does not contact the retraction restricting portion 19, and the protruding member 10C rotates to the protruding position illustrated in FIG. 8B.

Figure 9:
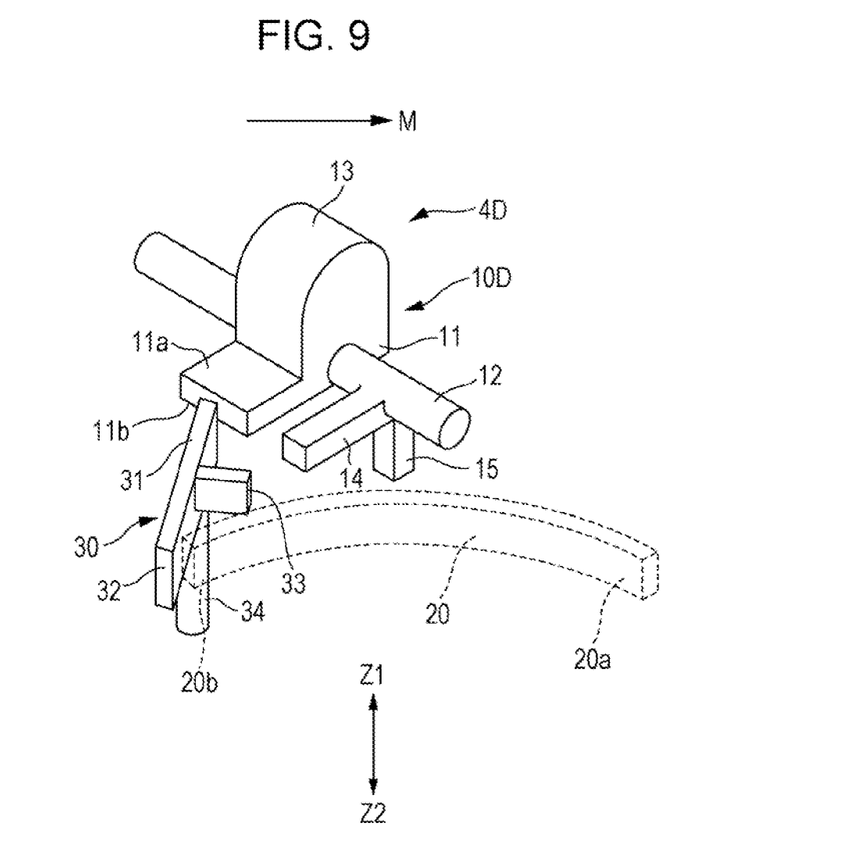
FIG. 9 is a partial perspective view illustrating the structure of a dot unit according to a fifth embodiment.
Figure 10A:
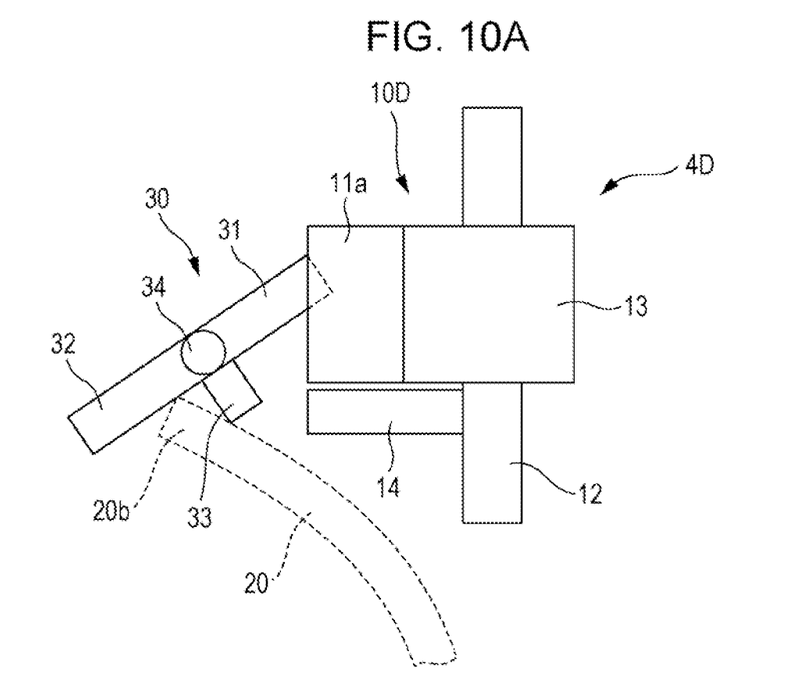
FIGS. 10A and 10B illustrate the operations of the protruding member and the rotation restricting member illustrated in FIG. 9.
Figure 10B:
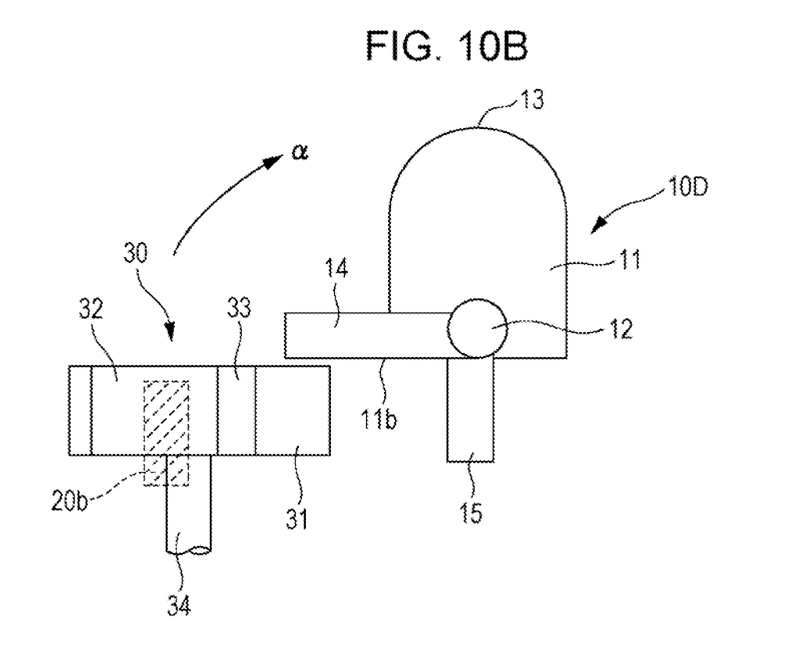
Figure 11A:
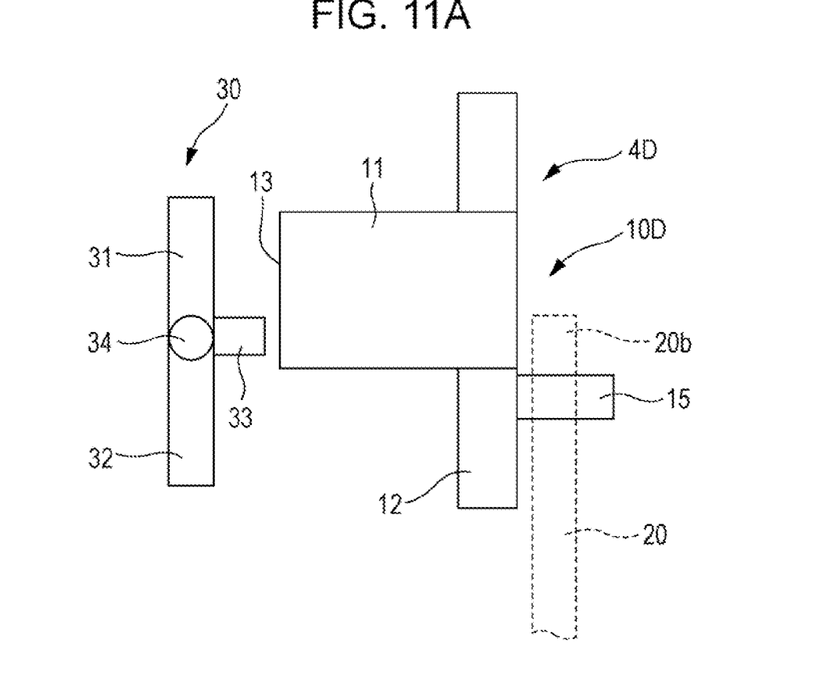
FIGS. 11A and 11B illustrate the operations of the protruding member and the rotation restricting member illustrated in FIG. 9.
Figure 11B:
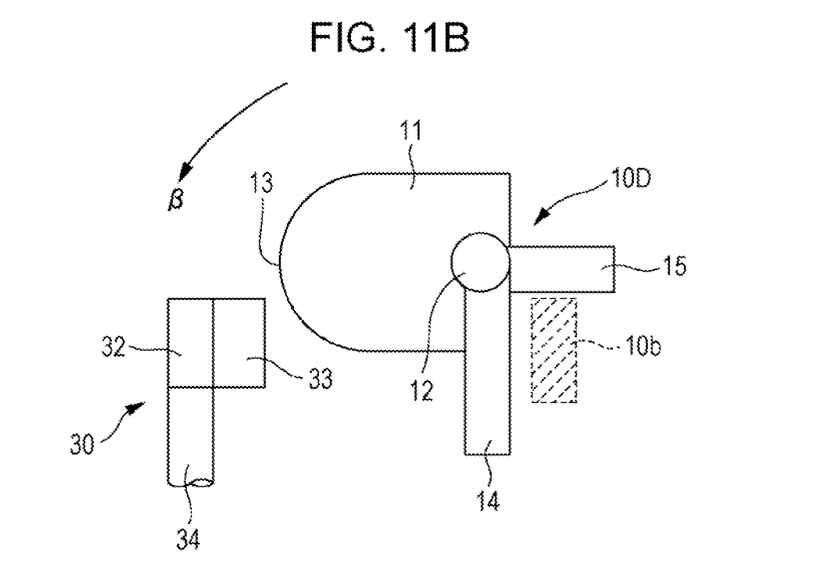

FIGS. 9 to 11B illustrate a dot unit 4D according to a fifth embodiment of the present invention. FIGS. 10A and 11A are plan views of the dot unit 4D, and FIGS. 10B and 11B are side views of the dot unit 4D.

In the dot unit 4D, a protruding member 10D is integrally formed with the support shaft 12, which extends from both sides of the protruding member 10D. The pressed portion 14 for protruding movement and the pressed portion 15 for retracting movement are integrally formed with the support shaft 12. The protruding member 10D includes a restricting projection 11a that extends from the support portion 11 in a direction opposite to the reading direction M. A restricting surface 11b is formed on the lower side of the restricting projection 11a.

A rotation restricting member 30 is disposed adjacent to the protruding member 10D in the housing 2. The rotation restricting member 30 is supported so as to be rotatable around a shaft 34 that extends in the up-down direction (Z1-Z2 direction). The rotation restricting member 30 rotates between a restricting position illustrated in FIGS. 10A and 10B and a retracted position illustrated in FIGS. 11A and 11B. A stopper (not shown) prevents the rotation restricting member 30 from rotating in other directions.

The rotation restricting member 30 includes a restricting portion 31 and a pressed portion 32 for restricting movement. The restricting portion 31 and the pressed portion 32 extend in opposite directions. The rotation restricting member 30 further includes a pressed portion 33 for retracting movement that extends in a direction perpendicular to the pressed portion 32.

When the polymer actuator 20 is flexurally deformed as illustrated in FIGS. 10A and 10B, the tip end portion 20b of the polymer actuator 20 presses the pressed portion 14 for protruding movement, and the protruding member 10D rotates to the protruding position. Immediately afterward, the tip end portion 20b presses the pressed portion 32 for restricting movement, the rotation restricting member 30 is rotated in a clockwise direction, and the restricting portion 31 of the rotation restricting member 30 enters into a space under the restricting surface 11b of the protruding member 10D. Thus, the protruding member 10D is prevented from moving in the retracting direction 3.

As illustrated in FIGS. 11A and 11B, as flexural deformation of the polymer actuator 20 disappears, the tip end portion 20b of the polymer actuator 20 presses the pressed portion 33 for retracting movement, the rotation restricting member 30 rotates to the retracted position, and the restricting portion 31 becomes disengaged from the restricting surface 11b of the protruding member 10D. Moreover, the tip end portion 20b presses the pressed portion 15 for retracting movement and the protruding member 10D rotates to the retracted position.

In the embodiments described above, the longitudinal direction of the polymer actuator 20 is parallel to the surface 2a of the housing 2. Therefore, the thickness of the dot information display apparatus 1 can be reduced. However, the polymer actuator 20 may be disposed perpendicular to the surface 2a of the housing 2. Instated of the polymer actuator 20, an element having a comparatively large displacement amount, such as a shape memory alloy (SMA), a shape memory polymer (SMP), a piezoelectric polymer such as polyvinylidene fluoride (PVDF) may be used.

The uses of an electronic apparatus including protruding members according to an embodiment of the present invention are not limited to those of the dot display apparatuses according to the embodiments described above. For example, an electronic apparatus including protruding members according to an embodiment of the present invention may be used as an operation device including protruding members that are used as operation buttons and keytops are disposed so as to be protrudable from an operation panel and that are made to protrude as necessary.

When used as an operation device, with the embodiments illustrated in FIGS. 3 to 8B, each of operation buttons and keytops can made to protrude to an operation position and to retract from the operation position using a single actuator. With the embodiments illustrated in FIGS. 9 to 11B, a keytop that has rotated to an operable position can be stabilized in the protruding position, and the keytop is not likely to be retracted by an operation force.

What is claimed is:

1. An electronic apparatus comprising:
a housing;
a plurality of protruding members arranged along an operation direction and configured to protrude from a surface of the housing, each of the protruding members being supported rotatably around a rotation axis so as to be retractable into the housing;
a plurality of actuators each configured to rotate corresponding one of the protruding members in a rotation direction so as to protrude from the surface of the housing, the rotation direction having a rotation component along the operation direction; and
a plurality of restricting portions each configured to restrict tilting of corresponding one of the protruding members in the operation direction when the protruding member is protruding,
wherein each of the actuators bends in a direction following the surface of the housing.

2. The electronic apparatus according to claim 1,
wherein the rotation axis of each of the protruding members is diagonally disposed at an angle smaller than 90 degrees with respect to the operation direction.

3. The electronic apparatus according to claim 1,
wherein each of the protruding members includes a first pushing portion for protruding movement and a second pushing portion for retracting movement, and
wherein each protruding member protrudes when the actuator pushes the first pushing portion and the protruding member retracts when the actuator pushes the second pushing portion.

4. The electronic apparatus according to claim 3,
wherein the center of gravity of each of the protruding members is located forward in the operation direction with respect to the rotation axis when the protruding member is protruding.

5. The electronic apparatus according to claim 1, further comprising:
a plurality of retraction restricting portions each restricting further rotation of corresponding one of the protruding members when the protruding member is retracted.

6. The electronic apparatus according to claim 3, further comprising:
a plurality of rotation restricting members each provided for corresponding one of the protruding members and configured to be rotated by corresponding one of the actuators,
wherein, when the one of the protruding members is protruding, the corresponding rotation restricting member is set in a restricting position so as to restrict rotation of the protruding member in a retracting direction, and when a movement of the actuator rotates the protruding member in the retracting direction, the movement of the actuator sets the rotation restricting member in a retracted position in which the rotation restricting member does not contact the protruding member.

7. The electronic apparatus according to claim 1,
wherein the electronic apparatus is configured to display dot information, each of the plurality of protruding members representing a dot unit,
wherein the plurality of protruding members are arranged to form a plurality of dot display portions arranged along the operation direction with an interval provided between adjacent dot display portions, each of the dot display portions including a plurality of dot units, wherein each display portion displays a unit of information by selectively making the protruding members therein protrude or retract, and wherein the operation direction corresponds to a reading direction of the information.

8. The electronic apparatus according to claim 7, wherein each of the protruding members includes a first pushing portion for protruding movement and a second pushing portion for retracting movement, and wherein each protruding member protrudes when the actuator pushes the first pushing portion and the protruding member retracts when the actuator pushes the second pushing portion.

9. The electronic apparatus according to claim 8, wherein the center of gravity of each of the protruding members is located forward in the operation direction with respect to the rotation axis when the protruding member is protruding.

10. The electronic apparatus according to claim 7, further comprising:

a plurality of rotation restricting members each provided for corresponding one of the protruding members and configured to be rotated by corresponding one of the actuators, wherein, when the one of the protruding members is protruding, the corresponding rotation restricting member is set in a restricting position so as to restrict rotation of the protruding member in a retracting direction, and when a movement of the actuator rotates the protruding member in the retracting direction, the movement of the actuator sets the rotation restricting member in a retracted position in which the rotation restricting member does not contact the protruding member.

11. An electronic apparatus comprising:

a housing;

a protruding member configured to protrude from a surface of the housing, the protruding member being rotatably supported in the housing; and an actuator configured to rotate the protruding member so as to protrude from the surface of the housing, wherein the protruding member includes a first pushing portion for protruding movement and a second pushing portion for retracting movement, and wherein the protruding member protrudes when the actuator pushes the first pushing portion and the protruding member retracts when the actuator pushes the second pushing portion, wherein each of the actuators bends in a direction following the surface of the housing.

12. The electronic apparatus according to claim 11, further comprising:

a rotation restricting member configured to be rotated by the actuator, wherein, when the protruding member is protruding, the rotation restricting member is set in a restricting position so as to restrict rotation of the protruding member in a retracting direction, and when a movement of the actuator rotates the protruding member in the retracting direction, the movement of the actuator sets the rotation restricting member in a retracted position in which the rotation restricting member does not contact the protruding member.

13. The electronic apparatus according to claim 1, wherein the housing includes:

a plurality of openings each provided for corresponding one of the plurality of protruding members, the plurality of protruding members protruding and retracting through the plurality of openings.

* * * * *